United States Patent [19]

Malmer, Jr.

[11] 3,889,242

[45] June 10, 1975

[54] MODIFIABLE COMPUTER FUNCTION DECODER

[75] Inventor: Michael M. Malmer, Jr., Livonia, Mich.

[73] Assignee: Burroughs Corporation, Detroit, Mich.

[22] Filed: Aug. 29, 1973

[21] Appl. No.: 392,510

Related U.S. Application Data

[63] Continuation of Ser. No. 186,275, Oct. 4, 1971, abandoned.

[52] U.S. Cl. .......... 340/172.5

[51] Int. Cl. .......... G06f 1/00

[58] Field of Search .......... 340/172.5, 347 DD; 235/154

[56] References Cited

UNITED STATES PATENTS

| | | | |
|---|---|---|---|
| 3,571,804 | 3/1971 | Hemdal | 340/172.5 |
| 3,634,883 | 1/1972 | Kreidermacher | 340/172.5 |
| 3,713,108 | 1/1973 | Edstrom et al. | 340/172.5 |
| 3,735,364 | 5/1973 | Hatta et al. | 340/172.5 |
| 3,754,218 | 8/1973 | Hatta et al. | 340/172.5 |

*Primary Examiner*—Raulfe B. Zache
*Attorney, Agent, or Firm*—Edwin W. Uren; Charles P. Padgett, Jr.; Paul W. Fish

[57] ABSTRACT

A modifiable computer function decoder is provided for use in a digital computer employing a relatively large number of microinstructions, many of which require one of a relatively smaller set of function codes. A fixed-length microinstruction storage register is divided into a first and second number of storage locations and the first set of storage locations is quasi-dedicated to the storage of function code although the large number of microinstructions required for the overall instruction set does not permit the actual dedication of the first set of storage locations exclusively to function code. Signals stored in the second set of storage locations are used to recognize particular microinstructions which require a particular function code but in which the first set of storage locations was not actually dedicated to function code and to generate modifier signals in response to this recognition. The signals from the first storage section are fed to a modifier logic circuit which is responsive to various combinations of modifier signals to alter the signals stored in the first set of storage locations so as to produce the desired function code even in those circumstances in which the first set of storage locations was not originally dedicated to the storage of function code.

5 Claims, 5 Drawing Figures

INVENTOR.
MICHAEL M. MALMER JR.
BY

| | FUNCTION MNEMONIC | X-FIRST REGISTER Y-SECOND REGISTER OPERATION | FD0,1...7 FUNCTION CODE QU7 | QU6 | QU5 | INVERSE QU4 | UFKC PRESET/RESET KCYF | UFNK NORMAL * KCYF UP | UFCS COMPLEMENT INP 1 (SOURCE) | UFCD COMPLEMENT INP 2 (DEST) | UFD2/ SUM OUTPUT TO KS | UFD23 CARRY OUTPUT TO KS | UFSW SOURCE WRITE FROM KS | UFDW DEST. WRITE FROM KS | UF11 INHIBIT INP 1 TO ADDER | UF12 INHIBIT INP 2 TO ADDER | UFX EXCHANGE | UFD5 SET UP L,E,H FLAGS |
|---|---|---|---|---|---|---|---|---|---|---|---|---|---|---|---|---|---|---|
| 0 | CPY XY | $X \rightarrow Y$ | 0 | 0 | 0 | 0 | 0 | 0 | 0 | 0 | 1 | 0 | 0 | 1 | 0 | 1 | 0 | 0 |
| 1 | CPY YX | $Y \rightarrow X$ | 0 | 0 | 0 | 1 | 0 | 0 | 0 | 0 | 1 | 0 | 1 | 0 | 1 | 0 | 0 | 0 |
| 2 | XCH XY | $X \rightarrow Y; Y \rightarrow X$ | 0 | 0 | 1 | 0 | 0 | 0 | 0 | 0 | 1 | 0 | 0 | 1 | 0 | 1 | 1 | 0 |
| 3 | INC XY | $X+1 \rightarrow X,Y$ | 0 | 0 | 1 | 1 | 1 | 1 | 0 | 0 | 1 | 0 | 1 | 1 | 0 | 1 | 0 | 0 |
| 4 | AND XY | $X_n \cdot Y_n \rightarrow Y_n$ | 0 | 1 | 0 | 0 | 0 | 0 | 0 | 0 | 0 | 1 | 0 | 1 | 0 | 0 | 0 | 0 |
| 5 | AND YX | $Y_n \cdot X_n \rightarrow X_n$ | 0 | 1 | 0 | 1 | 0 | 0 | 0 | 0 | 0 | 1 | 1 | 0 | 0 | 0 | 0 | 0 |
| 6 | OR XY | $X_n + Y_n \rightarrow Y_n$ | 0 | 1 | 1 | 0 | 0 | 0 | 0 | 0 | 1 | 1 | 0 | 1 | 0 | 0 | 0 | 0 |
| 7 | OR YX | $Y_n + X_n \rightarrow X_n$ | 0 | 1 | 1 | 1 | 0 | 0 | 0 | 0 | 1 | 1 | 1 | 0 | 0 | 0 | 0 | 0 |
| 8 | SUBT XY | $Y-X \rightarrow Y$ | 1 | 0 | 0 | 0 | 1 | 1 | 1 | 0 | 1 | 0 | 0 | 1 | 0 | 0 | 0 | 0 |
| 9 | SUBT YX | $X-Y \rightarrow X$ | 1 | 0 | 0 | 1 | 1 | 1 | 0 | 1 | 1 | 0 | 1 | 0 | 0 | 0 | 0 | 0 |
| 10 | CMP XY | Y-X&FLG.RES | 1 | 0 | 1 | 0 | 1 | 1 | 1 | 0 | 1 | 0 | 0 | 0 | 0 | 0 | 0 | 1 |
| 11 | CMP YX | X-Y&FLG.RES | 1 | 0 | 1 | 1 | 1 | 1 | 0 | 1 | 1 | 0 | 0 | 0 | 0 | 0 | 0 | 1 |
| 12 | ADD XY | $X+Y \rightarrow Y$ | 1 | 1 | 0 | 0 | 0 | 1 | 0 | 0 | 1 | 0 | 0 | 1 | 0 | 0 | 0 | 0 |
| 13 | ADD YX | $Y+X \rightarrow X$ | 1 | 1 | 0 | 1 | 0 | 1 | 0 | 0 | 1 | 0 | 1 | 0 | 0 | 0 | 0 | 0 |
| 14 | XOR XY | $X_n \bullet Y_n \rightarrow Y_n$ | 1 | 1 | 1 | 0 | 0 | 0 | 0 | 0 | 1 | 0 | 0 | 1 | 0 | 0 | 0 | 0 |
| 15 | XOR YX | $Y_n \bullet X_n \rightarrow X_n$ | 1 | 1 | 1 | 1 | 0 | 0 | 0 | 0 | 1 | 0 | 1 | 0 | 0 | 0 | 0 | 0 |

FIG.5

MODIFIABLE COMPUTER FUNCTION DECODER

REFERENCE TO RELATED APPLICATIONS

This application is a continuation of application Ser. No. 186,275 filed on Oct. 4, 1971 by the present inventor and now abandoned.

BACKGROUND OF THE INVENTION

The invention relates to electrical binary signal decoders in general and more particularly to computer function decoders.

Prior art discloses a great number of decoders used to decode computer function signals. A typical example would be represented by a system having a binary storage means or register and a decoding means usually comprising a number of logic elements operably coupled to provide predetermined electrical outputs in accordance with specific combinations of input signals received from the register. Each function to be decoded is represented by a certain combination of input signals. Since each combination is stored in the register, the number of function instruction codes which can be stored is absolutely limited by the number of storage elements in the register. For example, a register having four binary storage elements has a capacity for storing a maximum of 16 distinct function codes. Since some contemporary computer applications demand a capability of an immense number of functions, the hardware requirement for storing function instructions and the accompanying cost for this hardware is quite formidable. The total cost is, of course, not only that of the hardware but also of the time required for construction. Maintaining a system with a relatively large amount of hardware also contributes to its total cost. Programing such a system is also necessarily a relatively complex, time consuming and costly procedure; and, of course, the more complex the program, the more difficult it is to debug.

Regardless of the initial complexity of the instruction set it is often discovered that a fixed set of function instructions are sufficient to describe an entire range of register operations. For example, 16 function codes are adequate to describe the 16 basic instructions required for operations including an X and a Y register. These functions occur in many of the microinstructions and it would be relatively simple to dedicate four registers of the microinstruction register solely to the generation of these 16 function codes. It has been found, however, that as the complexity of the instruction set increases, it is impossible to dedicate a fixed portion or section of the microinstruction register solely to the generation of function code in all circumstances. In such circumstances, the problem may be solved by the addition of the costly hardware as by increasing the size of the instruction register but this results in increased system cost and in a deviation from the nearly standard 16 bit instruction register.

SUMMARY OF THE INVENTION

The present invention solves the above-referenced problem without increasing the size of the overall instruction register by employing a function modifier or pre-decoder which recognizes those instructions in which a particular section of the storage register was not solely dedicated to the storage of function code and generates a modifier signal which can be used to force the signals actually stored in that portion of the instruction register to a particular state so as to decode a correct function code regardless of what was actually stored in that section.

Accordingly, it is an object of the present invention to provide a modifiable computer function decoder which requires a minimum of costly hardware.

It is another object of the invention to provide a decoder which is relatively simple to construct.

It is yet another object of the invention to provide a decoder which is relatively simple to maintain due to a clear organization of possible failure modes and simpler design criteria for diagnostic tests.

It is still another object of the invention to provide a decoder which is relatively simple to program.

An important aspect of the invention is the use of logic circuits which expand the total function signal capacity of a decoder system by providing for the modification of a relatively small number of stored function signals by another relatively small number of modification signals.

BRIEF DESCRIPTION OF THE DRAWINGS

These and other objects, aspects and advantages of the invention will be more clearly understood from the following description when read in conjunction with the accompanying drawings, in which:

FIG. 5 is a table of function control decode logic.

GENERAL DESCRIPTION OF THE INVENTION

Figure 1:
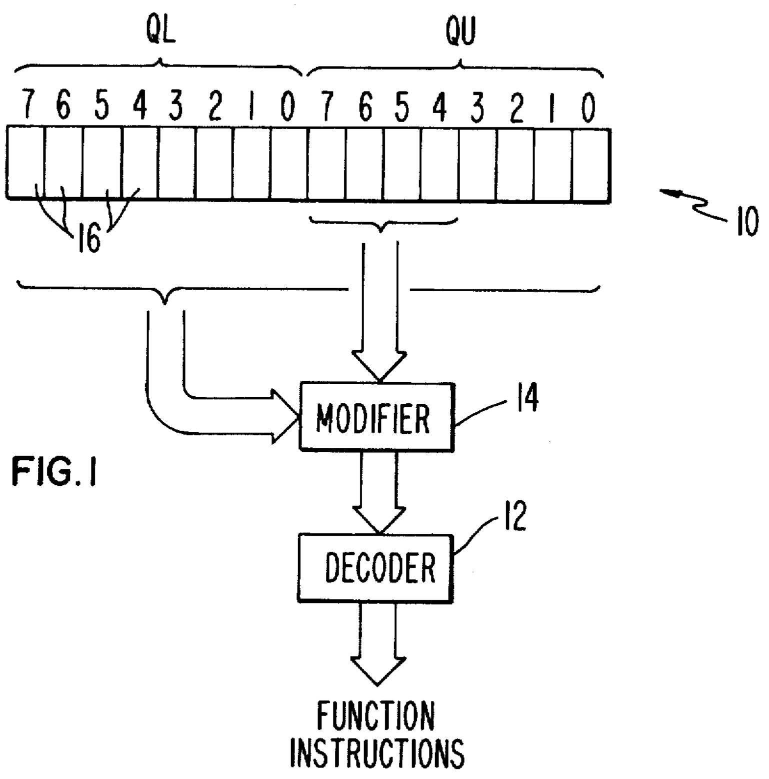
FIG. 1 is a diagram of a modifiable computer function decoder embodying features of the invention.

The modifiable, computer function decoder shown by FIG. 1 has a storage means or register 10, a decoding means or decoder 12 and a modifying means or modifier 14. The modifier is operably coupled to receive data from predetermined sections of the register, the decoder, in turn, being operably coupled to receive data from the modifier.

Figure 4:
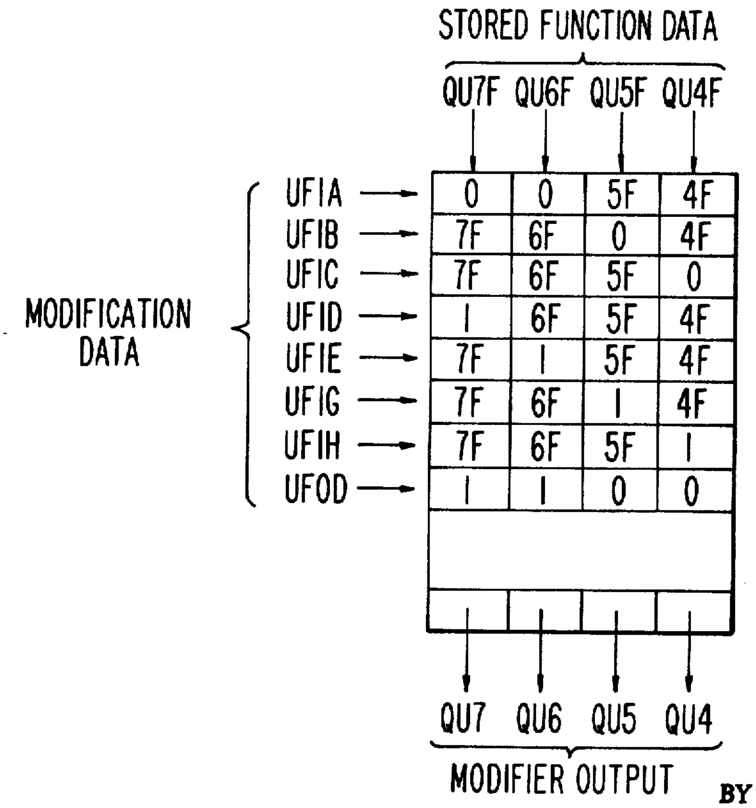
FIG. 4 is a table of modifier logic.
Figure 2:
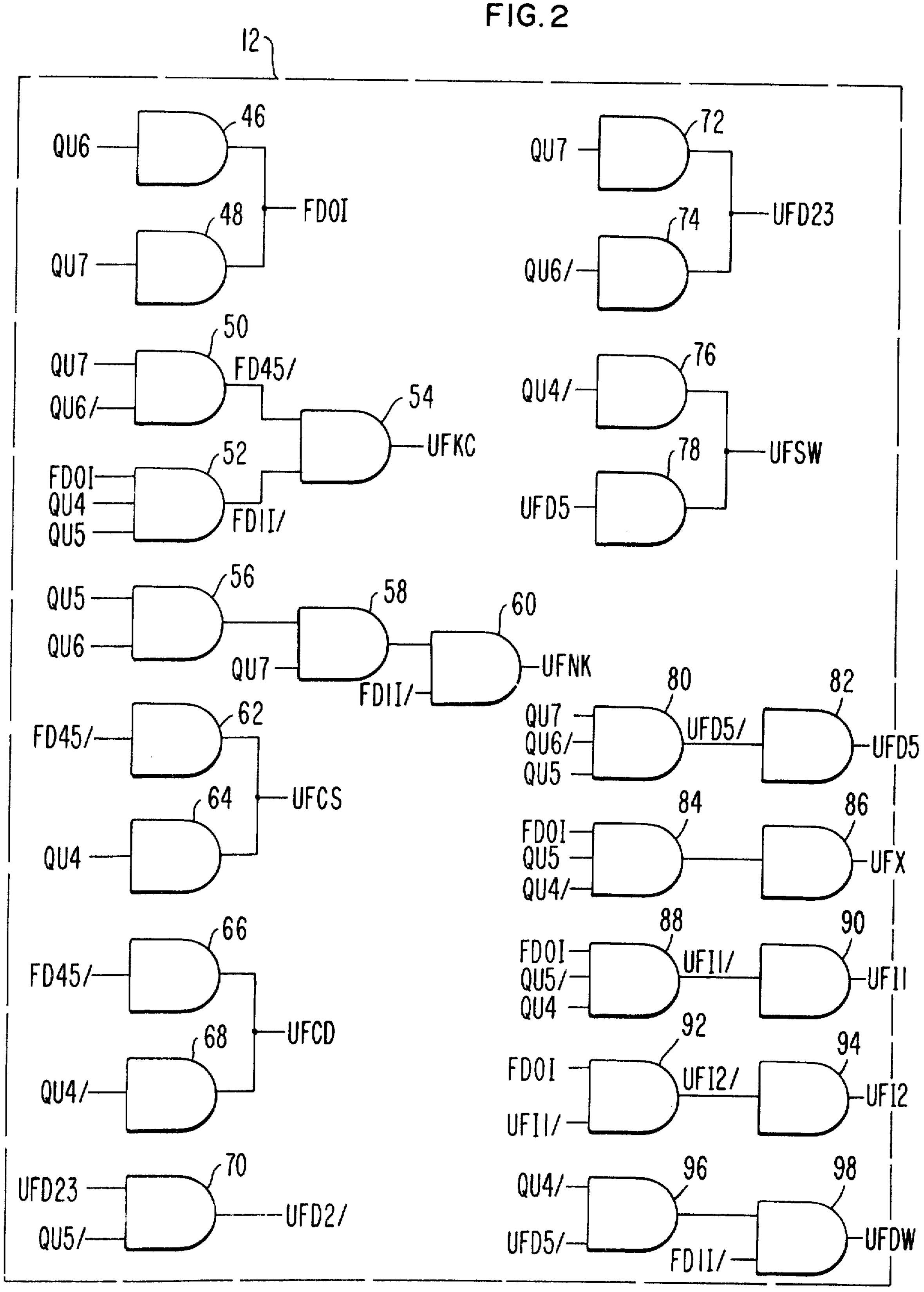
FIG. 2 is a logic diagram of a function decoder circuit.

The register 10 has a number of electrically bistable elements or flip flops 16, a total of 16 being used in the particular embodiment shown, each of the flip flops corresponding to a signal storage location. Both the inputs and the outputs of the flip flops are individually accessible, and information is thus inserted into and extracted from the register in a parallel manner. The 16 flip flops are designated QU0F through QU7F and QL0F through QL7F. Set and reset outputs thereof will thus be similarly designated, for example, QU7F and QU7F/ respectively or QL3F and QL3F/, respectively. A group of four flip flops, QU4F through QU7F, is used to store signals to be decoded ultimately into 16 possible computer function signals. These storage locations, QU4F through QU7F, are therefore quasi-dedicated to the storage of function code. The remaining 12 flip-flops are used to store other elements of the microinstruction which can be used to identify particular microinstructions which require a function code but in which the registers QU4F through QU7F are not dedicated solely to the storage of function code so that modifier signals can be generated. The decoder 12 has a number of logic elements or gates operably coupled as shown by FIG. 2 to decode combinations of two posible states each of four input signals derived originally rom the four register flip flops, QU4F through QU7F. 'he modifier 14 also has a number of logic elements or ates; and these are operably coupled as shown by FIG. to pass input signals received from the group of four lip flops, forcing each signal to assume one of two posible states or permitting them to pass unmodified as irected by modification signals produced in response o the recognition of particular microinstructions in 'hich the four flip-flops, QU4F through QU7F, are not edicated to the storage of function code but which one-the-less require a particular function code, the ecognition having been achieved by observing the sigals stored in the other twelve flip-flops and ascertain-1g that some particular combination of stored signals present which correspond to some predetermined articular microinstruction. The modifier logic used is resented in table form by FIG. 4, and an overall table f function control decode logic is shown by FIG. 5.

OPERATION

Figure 3:
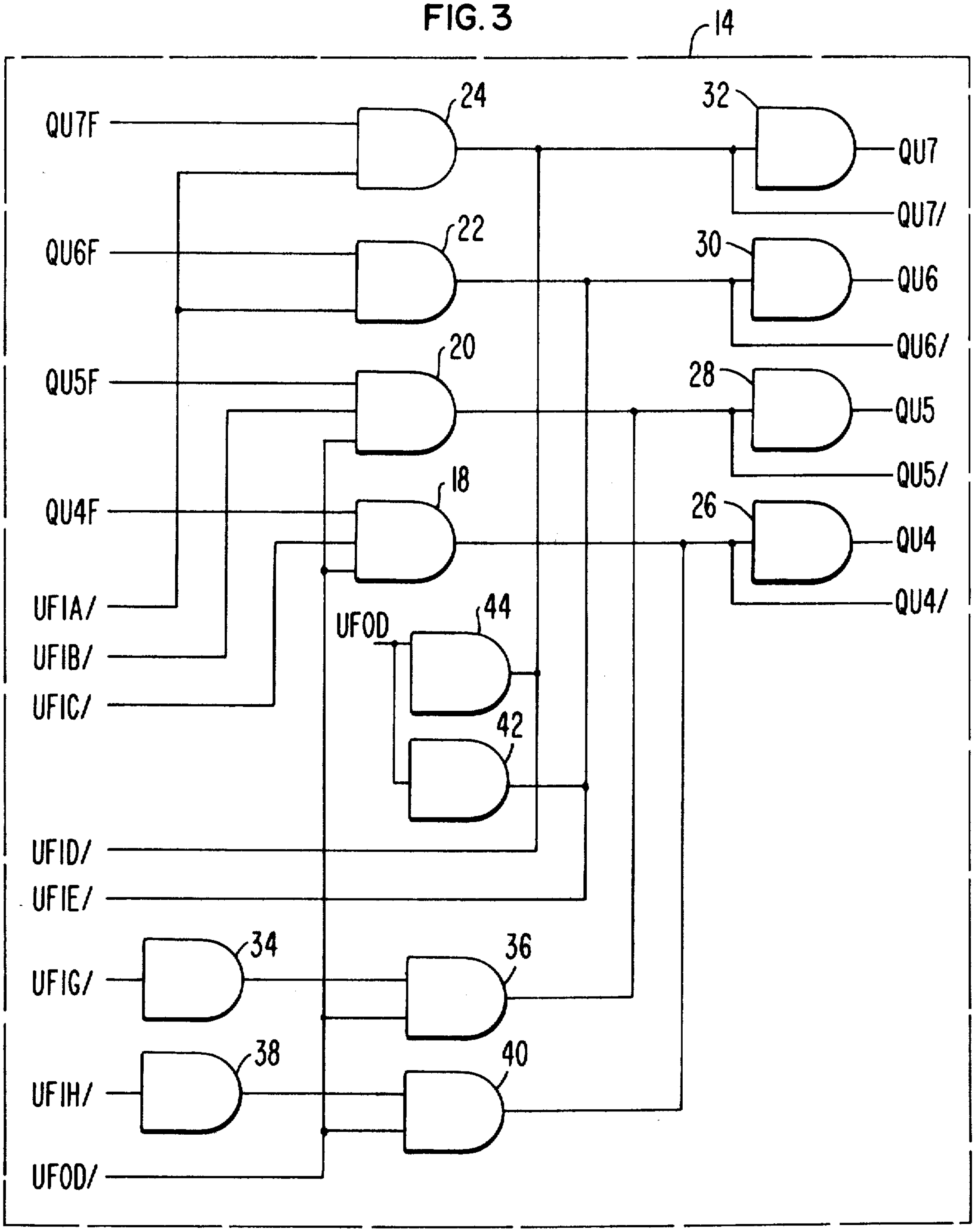
FIG. 3 is a logic diagram of a pre-decoder circuit.

Assuming that function code is residing in the storage ections of the register 10, the states of the flip flops )U4F through QU7F are represented by signals, QU4F hrough QU7F respectively, and are operably coupled o the modifier 14 as shown by FIG. 1. Within the modfier, as shown by FIG. 3, each of these signals is aplied to an input leg of one of four logic gates, 18, 20, :2 and 24 respectively. Whenever these signals are rue, or high, and there is to be no function modificaion, a low output from each of the gates 18 through 24 espectively is produced. This low output is coupled to ne of four logic gates 26, 28, 30 or 32, it being inerted thereby to form one of the modifier output sigials QU4 through QU7 respectively. The outputs of the ;ates 18 through 24 also supply modifier outputs QU4/ hrough QU7/ respectively.

Modification signals derived from information stored n other storage sections of the register are represented y signals UF1A through UF1H, with the exception of JF1F, and also by UF0D. The logical inverse of UF1A, hat is, UF1A/, is applied to the remaining input leg of ach of the gates 22 and 24. In accordance with the nodifier logic table shown by FIG. 4, when UF1A is rue, or high, a low UF1A/ signal will cause the outputs f both of the gates 22 and 24 to be high. These high utputs are each operably coupled to an input of one f the two logic gates 30 and 32 respectively, the oututs therefrom being low, or false. Assuming that low, r false, output signals represent binary zeros and that igh, or true, output signals represent binary ones, it as thus been shown that, when data modification sigal UF1A is true, lows, or binary zeros, will be forced o appear at the modifier outputs for QU6 and QU7 as hown by the table in FIG. 4. The logical inverse of JF1B, that is, UF1B/, is applied to a second of three nput legs of the gate 20. When UF1B is true, or high, low UF1B/ signal will cause the output of the gate 20 o be high. This high output is operably coupled to an nput of the gate 28, the output therefrom being low, his low representing a binary zero appearing at the nodifier output for QU5 as shown by the table in FIG. 4. The logical inverse of UF1C, that is, UF1C/, is aplied to a second of three input legs of the gate 18. When UF1C is true, or high, a low UF1C/ signal will ause the output of the gate 18 to be high. This high utput is operably coupled to an input of the gate 26, the output therefrom being low, this low representing a binary zero appearing at the modifier output for QU4 as shown by the table in FIG. 4.

The logical inverse of UF1D, that is, UF1D/, is applied to the singular input of the gate 32. When UF1D is true, or high, a low UF1D/ signal will cause the output of the gate 32 to be high, this high representing a binary one appearing at the modifier output for QU7 as shown by the table in FIG. 4. The logical inverse of UF1E, that is, UF1E/, is applied to the singular input of the gate 30. When UF1E is true, or high, a low UF1E/ signal will cause the output of the gate 30 to be high, this high representing a binary one appearing at the modifier output for QU6 as shown by the table in FIG. 4. The logical inverse of the signal UF1G, that is, UF1G/ is applied to the input of a gate 34. When UF1G is true, or high, a low UF1G/ signal will cause the output of the gate 34 to be high. This high input is coupled to an input leg of a logic gate 36, causing a low to appear at its output. This low output is coupled to the singular input of the gate 28, forcing a high at the output thereof, this high representing a binary one appearing at the modifier output for QU5 as shown by the table in FIG. 4. The logical inverse of the signal UF1H, that is, UF1H/, is applied to the input of a gate 38. When UF1H is true, or high, a low UF1H/ signal will cause the output of the gate 38 to be high. This high output is coupled to an input leg of a logic gate 40, causing a low to appear at its output. This low output is coupled to the singular input of the gate 26, forcing a high at the output thereof, this high representing a binary one appearing at the modifier output for QU4 as shown by the table in FIG. 4.

The signal UF0D is applied to the singular inputs of a pair of gates 42 and 44. When this signal is true, or high, low signals will appear at the outputs of these gates, these low output signals being applied to the singular inputs of gates 30 and 32 respectively. The low inputs to these gates will force highs at the outputs thereof, these highs representing binary ones appearing at the modifier outputs for QU6 and QU7 respectively as shown by the table in FIG. 4. The logical inverse of a signal UF0D, that is, UF0D/, is applied to the remaining input leg of each of the gates 18, 20, 36 and 40. In accordance with the modifier logic table shown by FIG. 4, when UF0D is true, or high, a low UF0D/ signal will cause the outputs of these four gates to be high. The high outputs of the gates 20 and 36 are both operably coupled to the singular input of gate 28, forcing a low at the output thereof, this low representing a binary zero appearing at the modifier output for QU5. The high outputs of the gates 18 and 40 are both operably coupled to the singular input of gate 26, forcing a low at the output thereof, this low representing a binary zero appearing at the modifier output for QU4.

In addition to being used independently, the modification signals may be applied in mutual combination. The operation will be substantially as previously described, the only additional factor requiring special consideration here being that an attempt to force a binary one will always override an attempt to force a binary zero. The output signals QU4 through QU7 and their logic inverses QU4/ through QU7/ as developed by the modifier circuits shown by FIG. 3 are applied to the decoder 12 as shown by FIG. 2. The operation of the decoder may be appreciated when reference is made to FIG. 5, which shows a table of function control decode logic applicable to the installation of the invention in a typical electronic data processing system.

The signals QU6 and QU7 are each applied to the singular inputs of one of a pair of gates 46 and 48 respectively; and, when they are both false, or low, the outputs will provide a high signal, FD01, which is used in certain portions of the decoder circuit. The signals QU6/ and QU7 are applied to the inputs of a logic gate 50; and, when either of them is false, or low, the output thereof will provide a high signal, FD45/. When both are true, or high, however, a low output is produced. The signals QU4, QU5 and FD0I are applied to the inputs of a logic gate 52; and, when any of them are false, or low, the output thereof will provide a high signal, FD1I/. When they are all true, or high, however, a low output is produced. The two signals, FD45/ and FD1I/, are applied to the inputs of a logic gate 54; and, when either input is false, or low, the output thereof will provide a high signal UFKC. Thus, when the signals QU7 and QU6/ are both true, or high, or when the signals FD0I, QU4 and QU5 are all true, or high, the signal UFKC will also be true, or high. As may be noted upon reference to the table of FIG. 5, the signal UFKC is one which is required when performing the following functions: INC XY, SUBT XY, SUBT YX, CMP XY and CMP YX.

The signals QU5 and QU6 are both applied to the input of a logic gate 56. When either of them is false, or low, the output of the gate 56 will be high. This output is applied to one input of a gate 58, the signal QU7 being applied to the remaining input. If the signal QU7 is also true, or high, at this time, the output of the gate 58 will be low. The output of the gate 58 and the signal FD1I/ are both applied to the inputs of a logic gate 60; and, whenever either signal is false, or low, the gate will provide a high signal, UFNK. As shown by the table of FIG. 5, the signal UFNK is one which is required when performing the functions requiring the signal UFKC and additionally when performing the functions ADD XY and ADD YX.

The signals FD45/ and QU4 are each applied to the singular inputs of one of a pair of gates 62 and 64 respectively; and, when they are both false, or low, the outputs will provide a high signal, UFCS. The functions of this signal are shown by the table of FIG. 5 in a manner similar to the functions of those signals previously described. Similarly, the signals FD45/ and QU4/ are each applied to the singular inputs of one of a pair of gates 66 and 68 respectively; and, when they are both false, or low, the outputs will provide a high signal, UFCD, the functions of which are shown by the table of FIG. 5. The signals UFD23 and QU5/ are applied to the inputs of a logic gate 70; and, when either of them is false, or low, the output thereof will provide a high signal, UFD2/, the functions of which being shown by the table of FIG. 5.

The signals QU7 and QU6/ are each applied to the singular inputs of one of a pair of gates 72 and 74 respectively. When they are both false, or low, the outputs will provide a high signal UFD23. Similarly, the signals QU4/ and UFD5, the development of the latter signal to be subsequently described, are each applied to the singular inputs of one of a pair of gates 76 and 78 respectively; and, when they are both false, or low, the outputs will provide a high signal, UFSW. The functions of the signals UFD23 and UFSW are shown by the table of FIG. 5. The signals QU7, QU6/ and QU5 are applied to the inputs of a logic gate 80; and, when any of them are false, or low, the output thereof will provide a high signal, UFD5/. When all three input signals are true, or high, however, a low output is produced. The output of the gate 80 is applied to the singular input of a gate 82. When the signal UFD5/ is false, or low, the output of the gate 82 will provide a high signal, UFD5. The signals FD0I, QU5 and QU4/ are applied to the inputs of a logic gate 84; and, the output of the gate 84 is applied to the singular input of a gate 86. When all three signals applied to the input of gate 84 are true, or high, the output of the gate 86 will provide a high signal, UFX. The signals FD0I, QU5/ and QU4 are applied to the inputs of a logic gate 88; and, when any of them are false, or low, the output thereof will provide a high signal, UFI1/. When all three input signals are true, or high, however, a low output is produced. The output of the gate 88 is applied to the singular input of a gate 90. When the signal UFI1/ is false, or low, the output of the gate 90 will provide a high signal, UFI1. The signals FD0I and UFI1/ are applied to the inputs of a logic gate 92; and, when either of them is false, or low, the output thereof will provide a high signal, UFI2/. When both input signals are true, or high, however, a low output is produced. The output of the gate 92 is applied to the singular input of a gate 94. When the signal UFI2/ is false, or low, the output of the gate 94 will provide a high signal UFI2. The signals QU4/ and UFD5/ are applied to the inputs of a logic gate 96. The output of the gate 96 and the signal FD1I/ are both applied to the inputs of a logic gate 98; and, whenever either signal is false, or low, the gate 98 will provide a high signal, UFDW. The functions of the signals UFD5, UFX, UFI1, UFI2, and UFDW are shown by the table of FIG. 5.

As an operational example, if the function of copying data residing in a Y, or second, register into an X, or first, register is to be performed, the logic involved would be that indicated by the table shown by FIG. 5. The function would be number 1, its mnemonic being CPY YX. The function code would be QU4, QU5/, QU6/ and QU7/. Additionally, the control signals that would be logically generated would by UFD2/, UFSW and UFI1. As may be verified by the logic diagram of the function decoder shown by FIG. 2, the logic equations generating these control signals would be as follows:

UFD2/ = UFD23/+QU5

UFSW = QU4·UFD5/

UFI1 = FD01·QU5/·QU4.

Other operations would be logically provided in a similar manner in accordance with the table of FIG. 5.

While the modifiable computer function decoder has been shown and described in considerable detail, it should be understood that many changes and variations may be made therein without departing from the spirit and the scope of the invention which is limited only by the appended claims.

What is claimed is:

1. In a digital computer having a relatively large set of microinstructions and a relatively smaller set of N-function codes, many of said microinstructions requiring one of said set of N-function codes for its implementation, a modifiable function decoder comprising:

a fixed-length microinstruction storage register having a first register section of $n$ storage locations quasi-dedicated to the storage of function code and a second register section of $m$ storage locations;

means coupled to said second register section and responsive to particular combinations of signals stored in one or more of said $m$ storage locations for identifying a particular microinstruction requiring a particular function code, said identified particular microinstruction being structured such that said required particular function code cannot be stored in said $n$ quasi-dedicated storage locations, and for generating one or more modifier signals in response thereto;

modifier means including:

first input means coupled to said first register section for receiving signals from said $n$ storage locations;

second input means coupled to said means for generating modifier signals; and logic means coupled to said first and second input means, said logic means responsive to one or more of said modifier signals for altering the signals stored in said $n$ storage locations to force the generation of said particular function code required for the implementation of said identified particular microinstruction and responsive to the absence of one or more of said modifier signals for allowing the unaltered contents of said $n$ storage locations to operate as an unmodified function code; and decoder means coupled to said logic means of said modifier means for decoding said modified and unmodified function codes as if said $n$ storage locations of the first section of said microinstruction register had been initially dedicated solely to the storage of said required set of N-function codes.

2. The modifiable function decoder of claim 1 wherein said fixed-length microinstruction storage register includes a plurality of electrically bistable elements, each of said bistable elements having a pair of outputs differentially responsive to and electrically indicative of the logical state of said bistable element, the outputs of the bistable elements included in said first register section being operably coupled to said first input means and the outputs of the bistable elements included in said second register section being operably coupled to said means for generating modifier signals.

3. The modifiable function decoder of claim 1 wherein said logic means includes:

a first set of $n$ logical AND gates, each of which has at least one input from said first input means and corresponding to one of said $n$ storage locations and each of said first set of logical AND gates having at least one input from said second input means for supplying a modifier signal thereto;

a second set of $n$ logical AND gates coupled to the outputs of said first set of logical AND gates for generating the function code ultimately to be decoded by said decoder means; and intermediate logic means with inputs from said second input means and outputs coupled to certain of the inputs and outputs of said first set of logical AND gates for altering signals received by said first input means in response to the presence of one or more of said modifier signals so as to force the output of said second set of logical AND gates so as to generate said particular function code required for the implementation of said identified particular microinstruction and for allowing the signals received by said first input means to pass to the output of said second set of logical AND gates without alteration in response to the absence of one or more of said modifier signals.

4. The modifiable function decoder of claim 3 wherein said decoding means includes a plurality of logical gating means for generating N functional operation signals from said set of N-function codes, where $N=2^n$, and where each of said bistable elements includes a JK flip-flop.

5. In a data processing system having a means for decoding a set of N-function codes which are required for the implementation of a large set of fixed-length microinstructions, said data processing system including a fixed-length microinstruction register having a set of $n$ storage locations quasi-dedicated to the storage of function code and wherein said data processing system requires a large set of microinstructions, the nature of said large set of microinstructions being restricted such that predetermined ones of said large set of microinstructions require particular ones of said set of N-function codes which cannot be stored in said $n$ quasi-dedicated storage locations, a method for generating all of said set of N required function codes for decoding in spite of said restriction, said method comprising the steps of:

testing signals in said fixed-length microinstruction register to determine if said stored microinstruction is one of said predetermined ones of said large set of microinstructions in which a required particular function code cannot be stored in said $n$ quasi-dedicated storage locations;

passing the signals stored in said $n$ quasi-dedicated storage locations to said decoder means in an unaltered condition for decoding purposes when it is determined that said stored microinstruction is not one of said predetermined ones of said large set of microinstructions;

generating modifier signals when it has been determined that said stored microinstruction is one of said predetermined ones of said large set of microinstructions;

altering the signals which were stored in said $n$ quasi-dedicated storage locations in response to said generated modifier signals so as to produce said particular one of said set of N-function codes which is required for implementation of said predetermined one of said large set of microinstructions; and passing the altered signals to said decoder means for decoding purposes.

* * * * *